United States Patent [19]
Wood

[11] Patent Number: 5,323,620
[45] Date of Patent: Jun. 28, 1994

[54] AIR CONDITIONERS

[75] Inventor: Robert Wood, West Yorkshire, England

[73] Assignee: IMI Air Conditioning Limited, West Yorkshire, England

[21] Appl. No.: 7,869

[22] Filed: Jan. 22, 1993

[30] Foreign Application Priority Data

Jan. 23, 1992 [GB] United Kingdom ............... 9201466

[51] Int. Cl.$^5$ .................... F25D 17/02; F04B 49/00
[52] U.S. Cl. ........................ 62/188; 137/392; 417/36
[58] Field of Search .................. 62/188; 137/392; 417/36

[56] References Cited

U.S. PATENT DOCUMENTS

| | | | |
|---|---|---|---|
| 3,757,317 | 9/1973 | Kahn et al. | 62/228.1 X |
| 4,061,442 | 12/1977 | Clark et al. | 137/392 X |
| 4,357,131 | 11/1982 | Guillemot | 417/36 X |
| 4,392,782 | 7/1983 | Kuehn, III et al. | 417/36 |
| 4,564,834 | 1/1986 | Steele | 340/622 |
| 4,638,288 | 1/1987 | Remec | 340/52 F |
| 4,748,821 | 6/1988 | Berenter | 62/188 |
| 4,896,052 | 1/1990 | Morrison et al. | 137/392 X |

FOREIGN PATENT DOCUMENTS

| | | |
|---|---|---|
| 0552913 | 7/1993 | European Pat. Off. |
| 63-082322 | 8/1988 | Japan |
| 2176327 | 9/1990 | Japan |
| 1043254 | 9/1966 | United Kingdom |
| 1375372 | 11/1974 | United Kingdom |
| 2105476 | 3/1983 | United Kingdom |

*Primary Examiner*—William E. Wayner
*Attorney, Agent, or Firm*—Cushman, Darby & Cushman

[57] ABSTRACT

An air conditioner condensate sump pump controller comprising a self heated PTC resistor located in the sump including an ambient compensation circuit. When the condensate reaches the resistor level due to decreased resistance the sump pump is energized reduce the condensate level.

10 Claims, 2 Drawing Sheets

AIR CONDITIONERS

FIELD OF THE INVENTION

This invention relates to air conditioners and more particularly to the continual removal therefrom of condensate that forms during their operation.

BACKGROUND OF THE INVENTION

As is well-known, air conditioners may serve to cool room air, for the purpose of which the air is drawn into the conditioner wherein it passes over a heat exchanger cooled by a refrigerant. Condensation thus forms on the surface of the heat exchanger and drips into a sump. In some arrangements, the condensate simply drains out of the sump, under the influence of gravity, through a pipe but in many cases it is essential or aesthetically desirable to lift the condensate, sometimes several meters, before discharging it to the desired location and it is common practice to use an electric pump for that purpose. Usually, the pump is of the reciprocating type and they are often noisy if air is drawn in. For this reason, it is important that the pump, when of such a type, operates only when the level of water in the sump is between pre-determined levels and so it is necessary to use a water level detection device.

The use of several alternative level detection devices has been proposed including mechanical devices such as magnetic float switches and devices which respond to changes in electrical conductivity. The former suffer from the disadvantage that they can readily become jammed by foreign matter such as metal or other particles or by the growth of biological matter on the moving parts. The latter often malfunction because the electrodes tend to become coated with electrically insulative material such as oil or fat or become permanently bridged by electrically conductive contaminants.

It is an object of the present invention to solve or mitigate the problems by proposing the use of an alternative form of level detection device.

SUMMARY OF THE INVENTION

According to the present invention, therefore, there is provided an air conditioner including a sump for collecting condensate that forms during the cooling of air passing, in use, through the conditioner, and an electrically-driven pump for periodically pumping said condensate from the sump when the condensate level in the sump, as determined by a level detection device, rises to a pre-determined level, characterised in that the level detection device comprises a positive temperature coefficient (PTC) resistor located at said pre-determined level, an electrical power supply for providing power to said resistor so as to cause it to heat up and operate, when surrounded by air, substantially at its critical temperature, and detection and control means to detect the reduction in resistance of the resistor upon the condensate reaching said predetermined level and as a consequence to cause the pump to operate, and to cause the pump to stop when the resistor has re-attained its critical temperature consequent on a drop in the condensate level.

In an air conditioner of the invention, therefore, when the condensate level in the sump is below the pre-determined level, the PTC resistor will be surrounded by air and will, under steady state conditions, attain a substantially constant operating temperature, i.e. its critical temperature. At this temperature, the PTC resistor will consume electrical energy at a substantially constant rate and the detection and control means will, in directly or indirectly detecting that rate, for example by way of the current flowing through the PTC resistor, cause the pump to be inoperative. On the other hand, as the condensate level rises and eventually contacts the PTC resistor, the resistor will be temporarily cooled since the thermal dissipation rate of the resistor when immersed in, or in contact with, the condensate will significantly increase; generally, the ratio of heat loss into water to heat loss into air is about 4:1. The current flowing through, and therefore the power consumption of, the PTC resistor will therefore increase, detection by the detection and control means of this increase being used to cause the pump to operate, thereby pumping condensate out of the sump until its level drops sufficiently that the resistor will again be surrounded by air, at which stage, or shortly thereafter, the pump will be stopped consequent on the resistor self-heating and again attaining its normal, critical operating temperature.

The properties of PTC resistors, on which the invention relies, will be familiar to those skilled in the electrical arts. Briefly, however, PTC resistors have non-linear temperature/resistance characteristics and, in particular, exhibit a significant increase in resistance at a critical temperature. When connected to a suitable power supply, with the resistor surrounded by air, the initial power consumption is relatively high and the resistor self-heats. When it becomes heated to its critical temperature, its resistance increases markedly and thus the current flowing through it, and so its power consumption, reduces. Eventually, at steady state conditions (other parameters, including ambient temperature, remaining constant) the power consumption will assume a level required just to overcome heat losses from the resistor, and the resistor will run at or around its critical temperature. By way of example, a PTC resistor used in the context of the present invention may have a critical temperature of about 100° C. On the other hand, contact or immersion of the PTC resistor with or in water cools the resistor to a temperature below its critical temperature whereupon its resistance decreases significantly and its power consumption increases. Changes in the resistance may be detected by, for example, monitoring the current flowing through the resistor at a substantially constant voltage drop across it and the changes used to trigger, or stop, as the case may be, operation of the pump.

Because the PTC resistor, as used in the invention, has no moving parts and will be substantially unaffected by fouling etc, the problems associated with the prior level sensing devices will not arise.

In a preferred embodiment, an air conditioner of the invention further includes a fail-safe level detecting device located at a higher level in the sump than said pre-determined level, said device being as defined above and effective, in conjunction with a control circuit, in preventing the formation of further condensate in the event that the condensate level in the sump reaches said higher level. Thus, if for some reason the condensate removal system fails to function correctly, e.g. because of a faulty pump or pipe blockage, the fail-safe level detecting device will serve to prevent the formation of excessive condensate and, therefore, overflow from the sump with accompanying "flooding". To that end, the fail-safe device and its control circuit may serve to switch off the air conditioner completely, or merely discontinue its air-cooling function, until remedial action is taken.

BRIEF DESCRIPTION OF THE DRAWINGS

The invention will now be described in more detail, by way of example only, with reference to the accompanying drawings in which.

DETAILED DESCRIPTION OF THE PREFERRED EMBODIMENT

Figure 2:
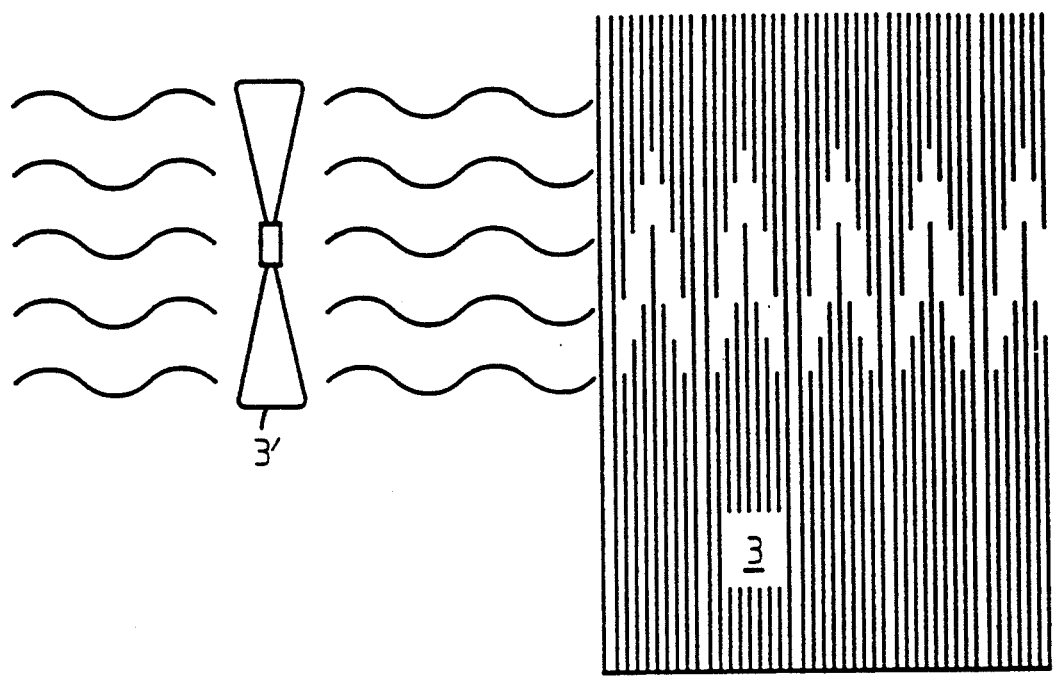
FIG. 2 is a schematic diagram of part of an air conditioner of the invention.
Figure 2:
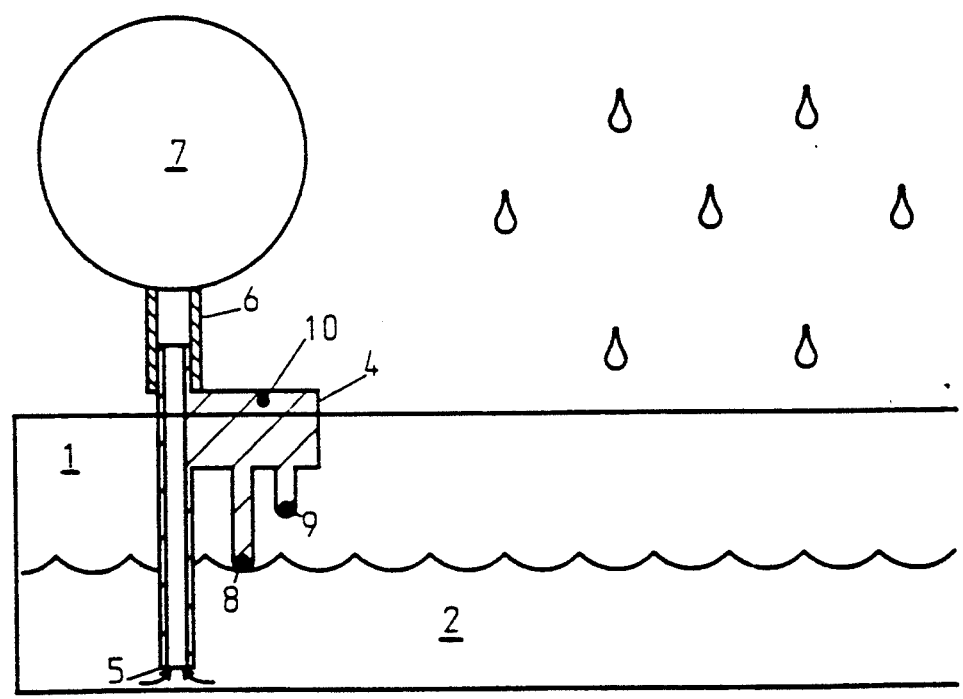

Referring firstly to FIG. 2, the air conditioner includes, as is usual, a sump 1 for collecting droplets of condensate 2 that forms during the passage of air forced by a fan 3' over the evaporator 3 of the refrigeration section of the conditioner. Located in the sump 1 is a level detection assembly-comprising a thermally conductive housing 4 that supports a duct 5. The housing 4 is so located in the sump 1 that the lower end of the duct 5 is adjacent to the base of the sump. The upper end of the duct 5 is connected by a tube 6 to a pump 7 which serves, as will be described later, periodically to pump the condensate 2 out of the sump via the duct 5.

The housing 4 supports a pair of low mass PTC resistors 8, 9 having a critical temperature of about 100° C. and an NTC resistor 10. The PTC resistor 8 is located at the normal maximum condensate level, the PTC resistor 9 at a higher, "alarm" condensate level, and the NTC resistor 10 is located at an even higher level so that it will at all times be surrounded by ambient air. The resistors 8 and 9 are positioned near the external surface of the housing 4 so that they are in good thermal contact with surrounding fluid.

Figure 1:
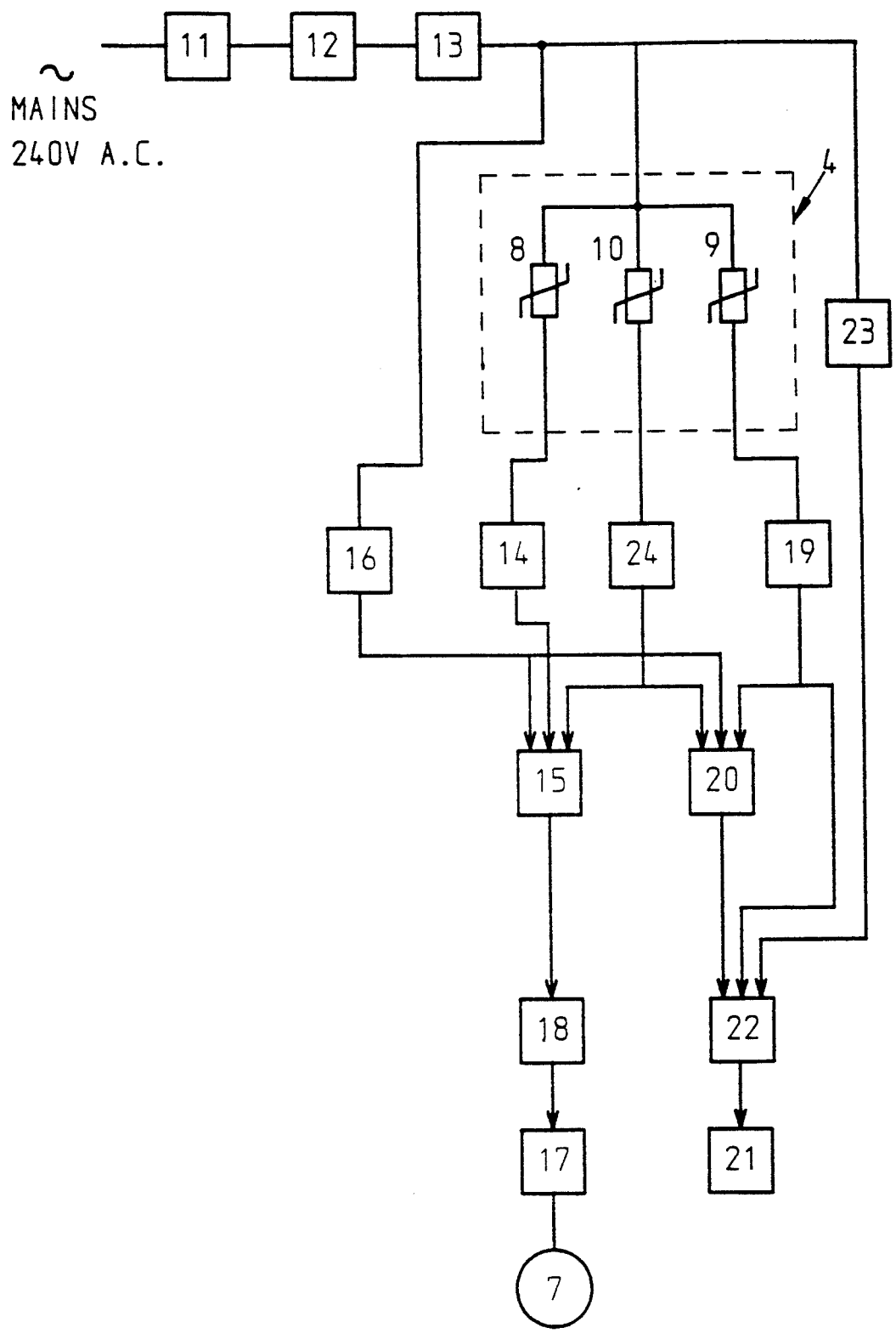
FIG. 1 is a schematic circuit diagram of a condensate level detection and control system forming part of an air conditioner of the invention.

The resistors 8, 9 and 10 form part of the circuit shown schematically in FIG. 1, which will now be described in more detail. The circuit is powered by a constant, low voltage (e.g. 22 v) dc source generated from the mains via a transformer 11, a rectifier 12 and a regulator 13. The current flowing through the resistor 8 is measured by a resistor 14 connected in series with the resistor 8, in terms of the potential drop across the resistor 14. This potential drop is compared, in a comparator 15, with a reference potential generated at 16. When the potential across resistor 14 just exceeds the reference potential, as determined by the comparator 15, i.e. when the level of the condensate 2 has reached the level of the resistor 8, the pump 7 is activated via an output drive unit 17 and condensate 2 is pumped out of the sump 1 via the duct 5 to a suitable discharge point. As the condensate level in sump 1 lowers, the resistor 8 becomes exposed to air and reheats, whereby the potential across the resistor 14 reduces and quickly assumes a value equal to or less than the reference value whereupon the pump 7 is switched off before the condensate falls to a level below the inlet to the duct 5. The cycle just described will from time to time repeat itself thus ensuring that, under normal operating conditions, the level of condensate 2 in the sump 1 will be within pre-determined limits and in particular will not exceed the level at which the resistor 8 is located.

When the circuit is first energised, the resistor 8 is "cold", i.e. at ambient temperature, and draws a relatively high power, say about 9 watts, thus indicating contact with condensate which may not, in fact, be the case. In order to prevent unnecessary operation of the pump 7, i.e. when the condensate level is, in fact, below that of the resistor 8, an inhibit timer 18 is incorporated into the circuit. Typically, this will impart a one minute delay to operation of the pump 7 even if the condensate level is high. The delay used in any particular case will, however, be selected to suit the characteristics of the resistor 8, and comes into operation each time the mains is switched on, i.e. at each start up of the air conditioner.

If for some reason, the condensate removal system fails to work, for example because the pump 7 develops a fault or because of a blockage in the duct 5 or associated pipework, it is important to stop the formation of condensate 2 in order to prevent possible flooding consequent on condensate overflowing from the sump 1. The PTC resistor 9, together with circuitry similar to that associated with the resistor 8, serves that purpose. More particularly, the current flowing through the resistor 9 is measured by a resistor 19 connected in series with it in terms of the potential drop across the resistor 19. This potential drop is compared in a comparator 20 with the reference value generated at 16. So long as the potential drop across the resistor 19 is less than the reference value, a relay 21 responsive to the output of the comparator 20 is energised and the cooling function of the air conditioner is operative. On the other hand, if the level of condensate 2 in the sump reaches the level of the resistor 9, the potential across resistor 19 will exceed the reference value generated at 16 and the relay is de-energised, thus stopping the cooling function and the formation of further condensate.

In order to ensure fail-safe operation of the condensate "alarm level" circuit just described, the resistor 9 is constantly monitored for continuity by a comparator 22 to which is fed an open circuit reference signal generated at 23; if an open-circuit is detected, the comparator 22 causes the relay 21 to become de-energised with consequent cessation of the air conditioner's cooling function.

In addition, the resistor 9 may, by locating it in the conditioned air stream, be utilised to protect the air conditioner, when this is used in a heat pump system, against failure of the refrigeration reversal device, where this is energised in cooling, which could cause the system to fail to uncontrolled heating when cooling is demanded. In the event of such failure, the temperature of the air passing over the resistor 9 will increase, thus causing the temperature of the resistor 9 to increase. The current flowing through the resistor 9 will therefore decrease until the open-circuit reference level is reached when the refrigeration compressor will be shut down. Typically, this will be arranged to occur at a temperature of 80° C.

As will be appreciated, correct operation of the circuits described above at various ambient temperatures will require an ambient temperature compensation circuit and this is provided for in the illustrated embodiment by the NTC resistor 10/signal conditioning circuit 24 which serves to maintain the reference level between the "dry/surface damp" and "fully wet" signal levels.

What is claimed is:

1. An air conditioner comprising:
    a sump for collecting condensate that forms during the cooling of air-passing, in use, through the conditioner, and
    an electrically-driven pump for periodically pumping said condensate from the sump when the condensate level in the sump, as determined by a level detection device, rises to a pre-determined level, wherein said level detection device comprises a first positive temperature coefficient (PTC) resistor located at said pre-determined level, an electrical power supply for providing power to said resistor so as to cause said resistor to heat up and operate, when surrounded by air, substantially at a critical temperature thereof, and detection and control means to detect the reduction in resistance of the resistor upon the condensate reaching said pre-determined level and as a consequence to cause the pump to operate, and to cause the pump to stop when the resistor has re-attained said critical temperature consequent on a drop in the condensate level, said detection and control means including an ambient temperature compensation circuit to ensure correct operation of the pump at any ambient air temperature within pre-determined upper and lower limits.

2. An air conditioner according to claim 1 wherein said first PTC resistor is mounted in a housing that supports a duct having a lower open end located adjacent to the base of said sump and an upper end connected to said pump, said condensate being pumped from the sump via said duct.

3. An air conditioner according to claim 2 wherein said first PTC resistor is located in a first thermally conductive, depending sheath forming part of the housing.

4. An air conditioner according to claim 1 further comprising a fail-safe level detecting device comprising a second PTC resistor located at a higher level in the sump than said pre-determined level, said second PTC resistor being effective, in conjunction with a control circuit, in preventing the formation of further condensate in the event that the condensate level in the sump reaches said higher level.

5. An air conditioner according to claim 4 wherein formation of further condensate is prevented by causing the air conditioner to switch off completely or to discontinue its cooling function.

6. An air conditioner according to claim 4 wherein said second PTC resistor is mounted in the housing recited in claim 2.

7. An air conditioner according to claim 6 wherein said second PTC resistor is located in a second, thermally conductive, depending sheath forming part of said housing.

8. An air conditioner according to claim 4 including circuit means for continuously monitoring operation of said fail-safe level detecting device, said circuit means being operative to switch off the air conditioner completely or to discontinue its cooling function in the event that the circuit means detects an operating fault in said fail-safe level detecting device.

9. An air conditioner according to claim 2 wherein the pump is arranged to pump condensate from the sump at such a rate that said first PTC resistor will re-heat and cause the pump to be switched off whilst the condensate level is still above the lower open end of said duct.

10. An air conditioner according to claim 1 wherein said ambient temperature compensation circuit includes a negative temperature coefficient resistor exposed to ambient air temperature.

* * * * *